US007495204B2

(12) United States Patent

Zhang et al.

(10) Patent No.: US 7,495,204 B2

(45) Date of Patent: Feb. 24, 2009

(54) REMOTE CONTROL RECEIVER DEVICE AND AMBIENT LIGHT PHOTOSENSOR DEVICE INCORPORATED INTO A SINGLE COMPOSITE ASSEMBLY

(75) Inventors: Jing Zhang, Singapore (SG); Pak Hong Yee, Singapore (SG); Wee Sin Tan, Singapore (SG)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 10 days.

(21) Appl. No.: 11/552,036

(22) Filed: Oct. 23, 2006

(65) Prior Publication Data

US 2008/0011940 A1 Jan. 17, 2008

(30) Foreign Application Priority Data

Jul. 13, 2006 (SG) ................................ 200604729

(51) Int. Cl.

*G01J 1/44* (2006.01)
*H04B 10/00* (2006.01)
*H04B 10/06* (2006.01)

(52) U.S. Cl. ........................... 250/214 AL; 250/214 B; 398/106; 398/202

(58) Field of Classification Search ........... 250/214 AL, 250/214 B; 398/106, 202
See application file for complete search history.

(56) References Cited

U.S. PATENT DOCUMENTS 4,241,456 A * 12/1980 Nakagaki et al. ............ 398/106
4,977,619 A * 12/1990 Crimmins .................... 398/96
5,151,628 A 9/1992 Osawa
5,210,467 A * 5/1993 Nagashima ................. 315/158
5,280,220 A * 1/1994 Carter ........................ 315/152
5,592,155 A 1/1997 Ehrenmann
5,973,811 A * 10/1999 Madey ....................... 398/131
5,977,882 A * 11/1999 Moore .................. 340/825.72
6,169,295 B1 1/2001 Koo
6,522,078 B1 * 2/2003 Okamoto et al. ............ 315/149
6,954,563 B2 10/2005 Kaplan
7,247,940 B2 7/2007 Hofer et al.
7,266,301 B2 9/2007 Stanchfield et al.
2006/0013595 A1 1/2006 Trezza et al.
2006/0036831 A1 2/2006 Karashima
2007/0194212 A1 * 8/2007 Lin et al. ................. 250/214.1
2008/0011940 A1 1/2008 Zhang et al.
2008/0013961 A1 1/2008 Yee et al.

FOREIGN PATENT DOCUMENTS

WO WO-2003/036672 5/2003

* cited by examiner

*Primary Examiner*—Stephen Yam

(57) ABSTRACT

An RC receiver device and an ambient light photosensor (ALPS) device are mounted on a single mounting device (e.g., circuit board or lead frame substrate) such that they are part of a single composite assembly. This reduces the amount of space that is consumed in electronic devices in which the assemblies are installed, which allows the electronic devices to be made smaller in size. In addition, implementing both the RC receiver device and the ALPS device in a single composite assembly lowers costs associated with manufacturing, assembling and shipping the composite assembly.

10 Claims, 6 Drawing Sheets

REMOTE CONTROL RECEIVER DEVICE AND AMBIENT LIGHT PHOTOSENSOR DEVICE INCORPORATED INTO A SINGLE COMPOSITE ASSEMBLY

CROSS REFERENCE TO RELATED APPLICATIONS

This application claims priority to Singapore Patent Application No. 200604729-4, filed on Jul. 13, 2006, which is incorporated herein by reference in its entirety.

TECHNICAL FIELD OF THE INVENTION

The invention relates to remote control receiver devices and ambient light photosensor devices.

BACKGROUND OF THE INVENTION

Remote control (RC) receiver devices are now being employed in a wide variety of electronic devices such as television sets (TVs), video cassette recorders (VCRs), digital video disc (DVD) players, personal computers (PCs), laptop computers, notebook PCs, and other types of devices. RC receiver devices receive electromagnetic signals that are transmitted over an air interface from an RC transmitter device operated by a user. The electromagnetic signals are typically infrared (IR) signals. A photodiode of the RC receiver produces electrical signals in response to receiving the electromagnetic signals transmitted by the RC transmitter device. The electrical signals produced by the photodiode are converted into digital signals, which are then processed by the IC of the RC receiver device. The IC produces an output signal that is used by the electronic device in which the RC receiver device is employed (e.g., a laptop computer) to cause the electronic device to perform some function (e.g., run a particular application software program).

The RC receiver device is typically mounted on a circuit board and connections are made between conductors of the circuit board and the input/output (I/O) pads of the IC of the RC receiver device. The circuit board having the RC receiver device mounted on it is then installed in the electronic device and electrical connections are made between the I/O ports of the circuit board and devices or components of the electronic device.

Like RC receiver devices, ambient light photosensor devices are now being employed in a variety of electronic devices such as flat panel TVs, PCs, laptop computers, notebook PCs home lighting systems, and wireless handheld devices such as personal digital assistants (PDAs) and mobile telephones. The ambient light photosensor devices sense the level of ambient light in the surroundings and adjust the brightness of a TV screen or of the display monitor of a computer or handheld device so that the lighting level is not too bright or too dark given the current ambient light level in the surroundings.

Ambient light photosensor devices typically include an IC having an ambient light photosensor on it that senses the level of ambient light in the surroundings and produces an electrical signal that is converted into a digital signal for processing by the IC of the ambient light photosensor device. The IC produces an output signal that is used by the electronic device in which the ambient light sensor device is employed to cause the electronic device to perform some function (e.g., adjust the brightness level of the TV screen or PC display monitor).

An ambient light photosensor device is typically mounted on a circuit board and connections are made between conductors of the circuit board and the I/O pads of the IC of the ambient light sensor device. The circuit board having the IC mounted on it is then installed in the electronic device and electrical connections are made between the I/O ports of the circuit board and components or device of the electronic device.

Many electronic devices now employ both RC receiver devices and ambient light photosensor devices. For example, a flat panel TV sold today will typically include one circuit board that has the RC receiver device mounted on it and another circuit board that has the ambient light sensor device mounted on it. Each circuit board consumes a significant amount of space in the electronic device. Of course, a major goal in manufacturing many consumer electronic devices is to reduce their size. To achieve this goal, manufacturers are constantly searching for ways to efficiently use the available space. However, the number and types of functions that many electronic devices perform continue to increase, which make it ever increasingly difficult to achieve the goal of reducing device size. Furthermore, using separate circuit boards for the RC receiver device and the ambient light photosensor device increases costs.

Accordingly, a need exists for a way to incorporate an RC receiver device and an ambient light photosensor device into an electronic device efficiently in terms of space utilization in the electronic device, thereby making it possible to reduce the overall size of the electronic device and/or to incorporate additional devices into the electronic device that provide it with additional functionality.

SUMMARY OF THE INVENTION

The invention provides a composite assembly on which a remote control (RC) receiver device and an ambient light photosensor (ALPS) device are mounted. By mounting the RC receiver device and the ALPS device on a single mounting device (e.g., circuit board or lead frame substrate) rather than on separate circuit boards, as is the current practice, the amount of space that is consumed in electronic devices that use both RC receiver devices and ALPS devices can be greatly reduced. The composite assembly comprises a mounting device, an RC receiver device mounted on the mounting device, and an ALPS device mounted on the mounting device. The RC receiver device has electrical connections that are connected to conductors of the mounting device. The ALPS device has electrical connections that are connected to conductors of the mounting device.

The method for making the composite assembly comprises mounting a remote control (RC) receiver device on a mounting device, connecting electrical connections of the RC receiver device to conductors of the mounting device, mounting an ALPS device on the mounting device, and connecting electrical connections of the ALPS device to conductors of the mounting device.

These and other features and advantages of the invention will become apparent from the following description, drawings and claims.

DETAILED DESCRIPTION OF AN EXEMPLARY EMBODIMENT

In accordance with the invention, an RC receiver device and an ALPS device are mounted on a single mounting device, such as a circuit board or lead frame substrate, for example, such that the RC receiver device and the ALPS device are part of a single composite assembly. This reduces the amount of space that is consumed in electronic devices in which the composite assemblies are installed, thereby allowing the electronic devices to be made smaller in size and/or to incorporate additional devices that provide the electronic devices with additional functionality without having to increase overall size. In addition, by implementing both the RC receiver device and the ALPS device in a single composite assembly, the costs associated with manufacturing, assembling and shipping the assemblies can be reduced.

It should be noted, however, that the invention applies to devices other than RC receiver devices and ALPS devices. RC receiver devices and ALPS devices are merely examples of two types of devices that operate at different wavelengths of light and that would be advantageous to implement in a single composite assembly. Therefore, for exemplary purposes, the principles and concepts of the invention will be described with reference to incorporating an RC receiver device and an ALPS device into a single composite assembly. Those skilled in the art will understand the manner in which these principles may be applied to other types of devices that operate at different wavelengths of light. Also, the invention is not limited with respect to the number of such devices that may be incorporated into a single composite assembly.

Figure 1:
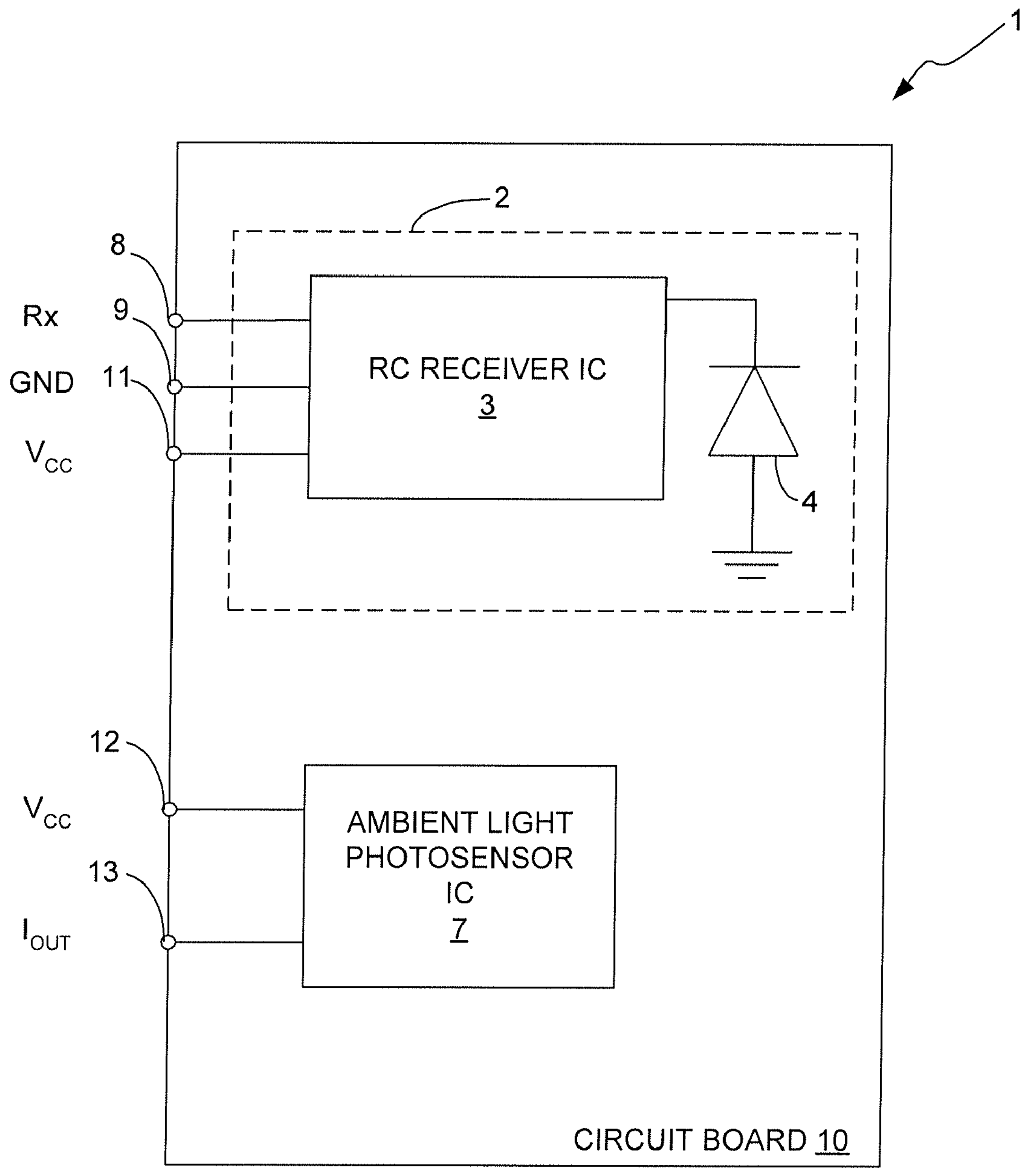
FIG. 1 illustrates a block diagram of the composite assembly of the invention in accordance with the exemplary embodiment, which includes an RC receiver device and an ALPS device mounted on and electrically connected to a mounting device.

FIG. 1 illustrates a block diagram of the composite assembly 1 of the invention in accordance with the exemplary embodiment, which includes an RC receiver device 2 and an ALPS device 7. The composite assembly 1 includes a mounting device 10, which is typically a printed circuit board (PCB) or lead frame substrate. The RC receiver device 2 and the ALPS device 7 are mounted on the mounting device 10. The RC receiver device 2 includes an RC receiver IC 3 and an IR photodiode IC 4. The IR photodiode 4 is represented symbolically, but it is actually a separate IC. The ALPS device 7 is an IC that comprises an ambient light photosensor (not shown). The RC receiver device 2 and the ALPS device 7 may be known devices that are currently available on the market.

The junctions labeled 8, 9, 11, 12 and 13 correspond to ports of the mounting device 10. The port 8 is an output port that receives the receiver signal, Rx, that is output at a pin (not shown) of the RC receiver IC 3 and sent over a conductive trace and wire bonds to the port 8. The port 9 is an input port of the mounting device 10 that is used to supply ground potential, GND, to a pin (not shown) of the RC receiver IC 3. The port 11 is an input port of the mounting device 10 that is used to supply the supply voltage, $V_{CC}$, to a pin (not shown) of the RC receiver IC 3. The port 12 is an input port of the mounting device 10 that is used to provide the supply voltage, $V_{CC}$, to a pin (not shown) of the ALPS IC 7. The port 13 is an output port of the mounting device 10 that receives the ALPS IC 7 output signal, $I_{OUT}$, which is output at a pin (not shown) of the ALPS IC 7.

The receiver signal Rx and the ALPS signal $I_{OUT}$ received at ports 8 and 13, respectively, of the mounting device 10 are sent to other devices or components (not shown) of the electronic device (not shown). These other devices or components use the signals in a known manner, e.g., to cause an application program to be executed by a processor, to cause the brightness of a display monitor to be adjusted, etc. The RC receiver photodiode IC 4 has a pin (not shown) that is electrically connected to a pin (not shown) of the RC receiver IC 3.

For purposes of describing an example of the manner in which the composite assembly of the invention may be implemented, the assembly is being described as having three separate ICs, namely, the RC receiver IC 3, the RC receiver photodiode IC 4 and the ALPS IC 7. This is because these devices are currently available on the market as three separate ICs. However, all of these devices may be integrated in the same IC or in two separate ICs. For example, the RC receiver IC 3 and the RC receiver photodiode IC 4 may be integrated into one IC and the ALPS device 7 may be implemented in a separate IC. Integrating more devices into the same IC or into two ICs enables the composite assembly to be further reduced in size and provides further cost savings.

The composite assembly 1 consumes much less space when installed in an electronic device than that which is consumed when an RC receiver device and an ALPS device are mounted on respective circuit boards and installed in an electronic device. Thus, the invention enables electronic devices to be made smaller in size and/or to include additional devices that provide additional functions to the electronic device. In addition, the manufacturing, assembly and shipping costs associated with the composite assembly are less than those associated with separate assemblies.

Figure 2:
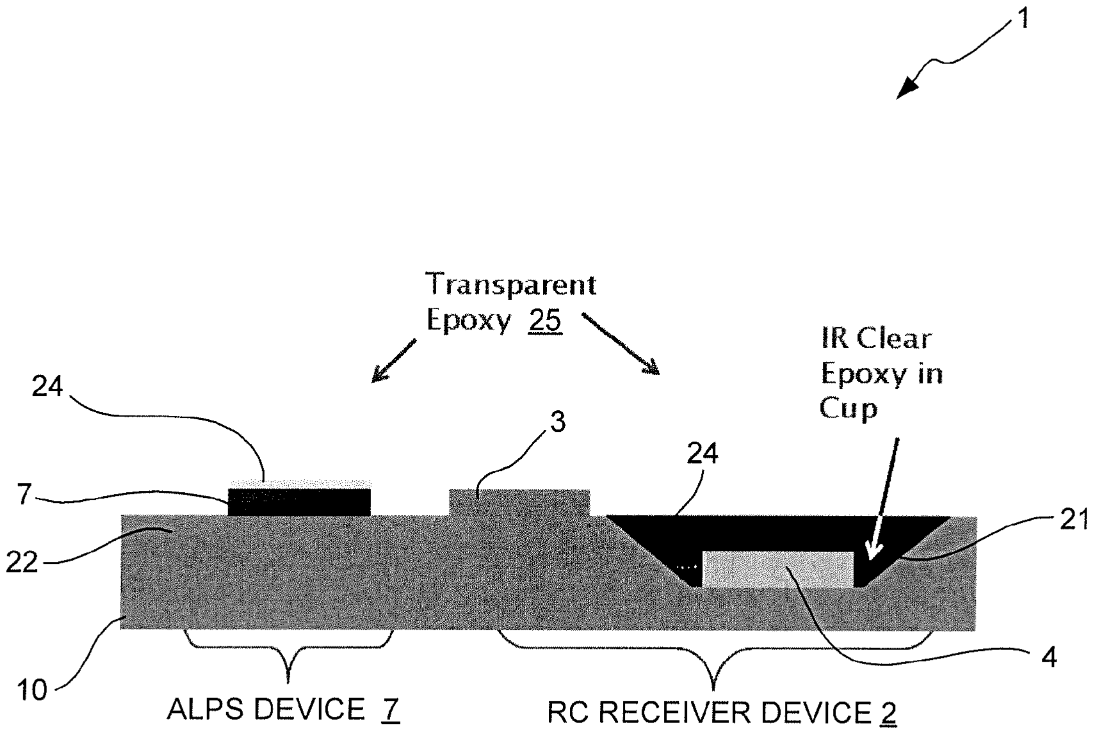
FIG. 2 illustrates a cross-sectional view of the composite assembly shown in FIG. 1 in accordance with an exemplary embodiment.

A first exemplary embodiment of the method for making the composite assembly 1 shown in FIG. 1 will now be described with reference to FIGS. 2 and 3. FIG. 2 illustrates a cross-sectional view of the composite assembly 1 shown in FIG. 1 in accordance with an exemplary embodiment. The RC receiver IC 3, the RC receiver photodiode IC 4 and the ALPS IC 7 are attached to the circuit board 10 using a known die-attach process. However, prior to attaching the ICs 3, 4 and 7, a cup 21 is formed in the substrate 22 of the circuit board 10. After the ICs 3, 4 and 7 have been attached, a wire-bonding process is performed to make all of the electrical connections between the pins of the ICs and conductors (not shown) of the circuit board 10. The manner in which wire bonding is performed is well known.

After the ICs 3, 4 and 7 have been wire bonded to the conductors of the circuit board 10, an IR clear epoxy 24 is dispensed into the cup 21 to encapsulate the RC receiver photodiode IC 4. The IR clear epoxy is then cured in an oven (not shown). The clear IR epoxy allows IR light to penetrate through it and impinge on the RC receiver photodiode IC 4, but will filter out all other wavelengths of light. Preferably, the IR clear epoxy is a silicone-base epoxy that obviates any potential problems associated with thermal stress that may result due to Coefficient of Thermal Expansion (CTE) mismatching. A variety of IR epoxies available on the market are suitable for this purpose.

The upper surface of the assembly 1 is then covered with a transparent epoxy 25. The transparent epoxy 25 may be applied using, for example, a transfer molding process or a sheet cast molding process. The transparent epoxy 25 allows ambient light to pass through it, which includes IR light.

However, the ALPS IC 7 has a visible-light coating 26 on its upper surface that filters out wavelengths of light other than visible light. Only the visible light will pass through the visible-light coating 26 and impinge on the ALPS die 7. A variety of visible-light coatings are available on the market that are suitable for this purpose. The remainder of the process steps are the normal process steps used when assembling a circuit board assembly today, and therefore will not be described.

Figure 3:
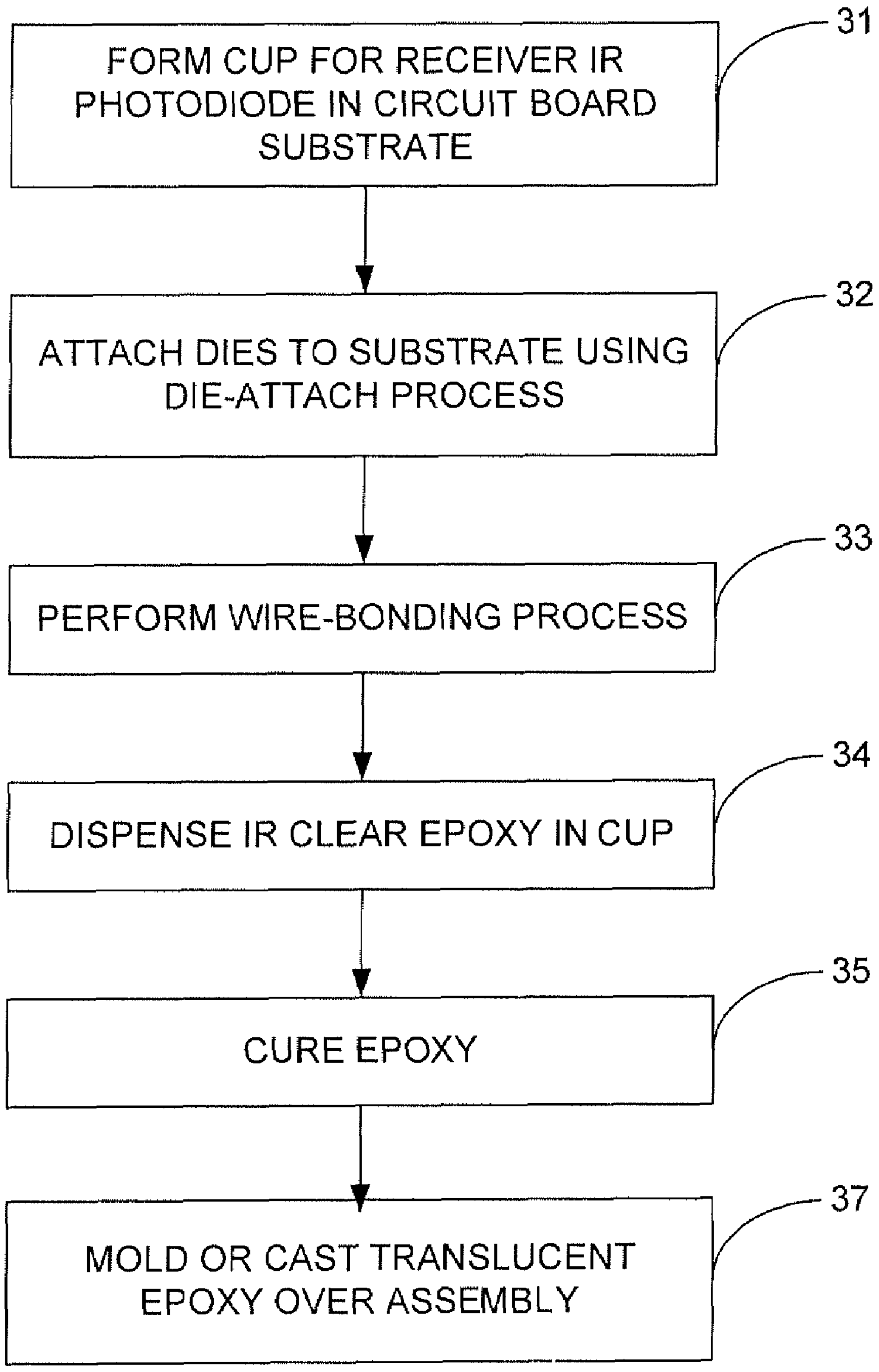
FIG. 3 illustrates a flowchart that represents the exemplary method described above with reference to FIG. 2.

FIG. 3 illustrates a flowchart that represents the exemplary method described above with reference to FIG. 2. A cup is formed in the substrate of the circuit board, as indicated by block 31. The ICs are attached using a die-attach process, as indicated by block 32. Intermediate process steps may be performed after forming the cup and before attaching the ICs. After the ICs have been attached, they are wire bonded to the conductors of the circuit board, as indicated by block 33. After wire bonding has been performed, IR clear epoxy is dispensed into the cup such that the epoxy encapsulates the receiver photodiode IC 4, as indicated by block 34. The IR clear epoxy is then cured, as indicated by block 35. The transparent epoxy 25 is then applied by using a molding or casting process, as indicated by block 37. As stated above, other known process steps are typically performed after the transparent epoxy has been molded or cast over the assembly.

The visible-light coating 26 is typically applied at the wafer level to the ALPS dies, and therefore is not shown as being part of the process represented by the flowchart shown in FIG. 3. The invention is not limited with respect to when any of the steps are performed, except in cases where it is necessary for one or more steps to be performed before one or more other steps are performed.

Figure 4A:
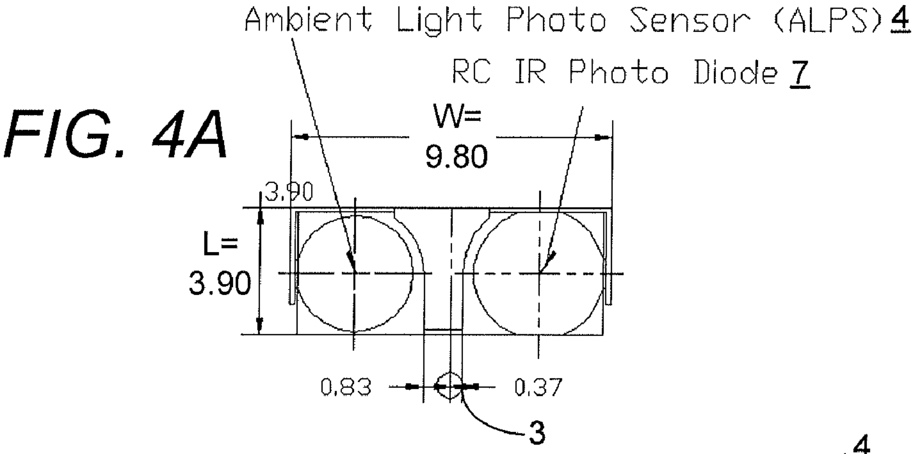
FIGS. 4A and 4B illustrate an example of the dimensions of the composite assembly shown in FIG. 2 after assembly has been completed.
Figure 4B:
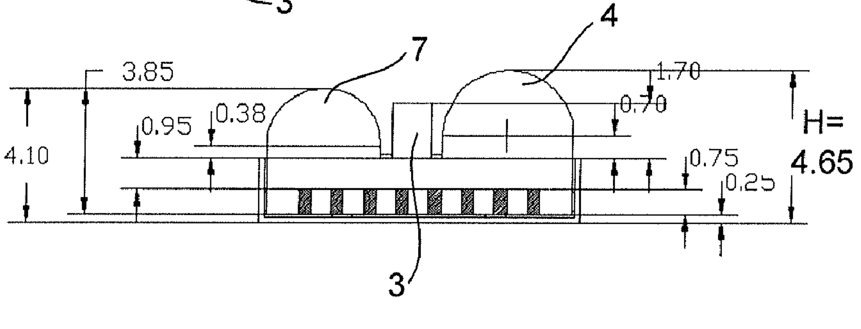

FIGS. 4A and 4B illustrate an example of the dimensions of the composite assembly 1 after assembly has been completed. The invention is not limited to the dimensions shown. The dimensions are provided to demonstrate the miniature nature of the assembly 1. The dimensions supplied are in units of millimeters (mm). In FIG. 4A, it can be seen that the overall width, W, of the assembly 1 is 9.80 mm. It can also be seen in FIG. 4A that the overall length, L, is 3.90 mm. It can be seen in FIG. 4B that the overall height, H, is 4.65 mm or less. Thus, the composite assembly 1 is extremely small in size and consumes only a very small amount of space in the electronic device in which it is employed.

Figure 5:
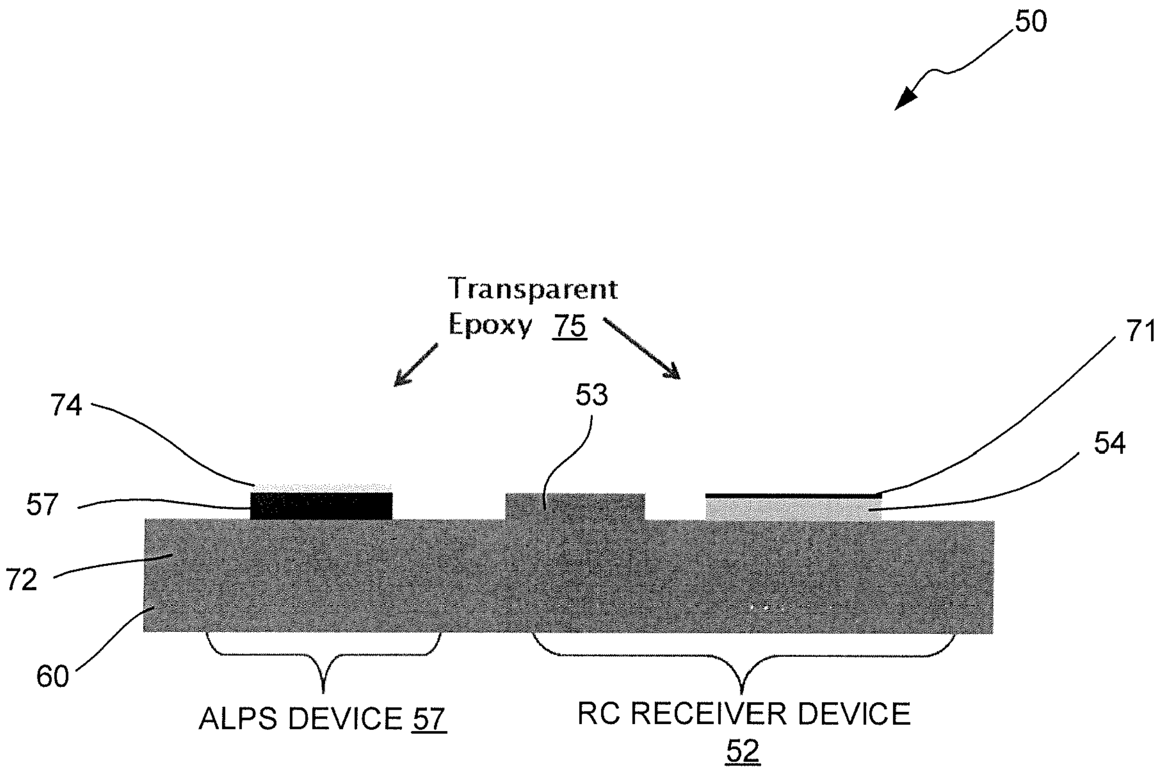
FIG. 5 illustrates a cross-sectional view of the composite assembly 50 of the invention.

Another exemplary embodiment of the method for making the composite assembly 1 shown in FIG. 1 will now be described with reference to FIGS. 5 and 6. FIG. 5 illustrates a cross-sectional view of the composite assembly 50 of the invention. The composite assembly 50 is similar to the composite assembly 1 shown in FIG. 2 except that the cup 21 shown in FIG. 2 is not needed. The elements 52, 53, 54, 57, 60, 72, and 54 may be identical to the elements 2, 3, 4, 7, 10, 22, and 24, respectively, shown in FIG. 2. The RC receiver IC die 53, the RC receiver photodiode IC die 54 and the ALPS IC die 57 are attached to the mounting device 60 using a known die-attach process. The mounting device may be a PCB or lead substrate. Prior to attaching the IC dies 53, 54 and 57, the dies 54 and 57 are pre-coated with coatings 71 and 74, respectively. The coatings 71 and 74 comprise materials that are capable of filtering out undesired wavelengths of light. The coating 21 allows IR light to pass through it and impinge on the RC photodiode die 4, but filters out all other wavelengths of light. The coating 74 allows visible portions of the ambient light to pass through it, but filters out other wavelengths of light. Thus, only visible light passes through the coating 74 and impinges on the ALPS photosensor die 7. A variety of IR and visible-light coating materials are currently available that are suitable for this purpose.

After the dies 53, 54 and 57 have been attached, a wire-bonding process is performed to make all of the electrical connections between the pads of the dies 53, 54 and 57 and conductors (not shown) of the mounting device 60. The upper surface of the assembly 50 is then covered with a transparent epoxy 75, which may be the same epoxy as the transparent epoxy 25 shown in FIG. 2. The transparent epoxy 75 may be applied using, for example, a transfer molding process or a sheet cast molding process. The transparent epoxy 75 allows ambient light to penetrate through it, which includes IR light. However, the visible-light coating 74 only allows visible light to pass through it and impinge on the ALPS die 57. The process steps that are performed after the transparent epoxy 75 has been applied are the normal process steps used when assembling a circuit board today. Therefore, these process steps will not be described.

Figure 6:
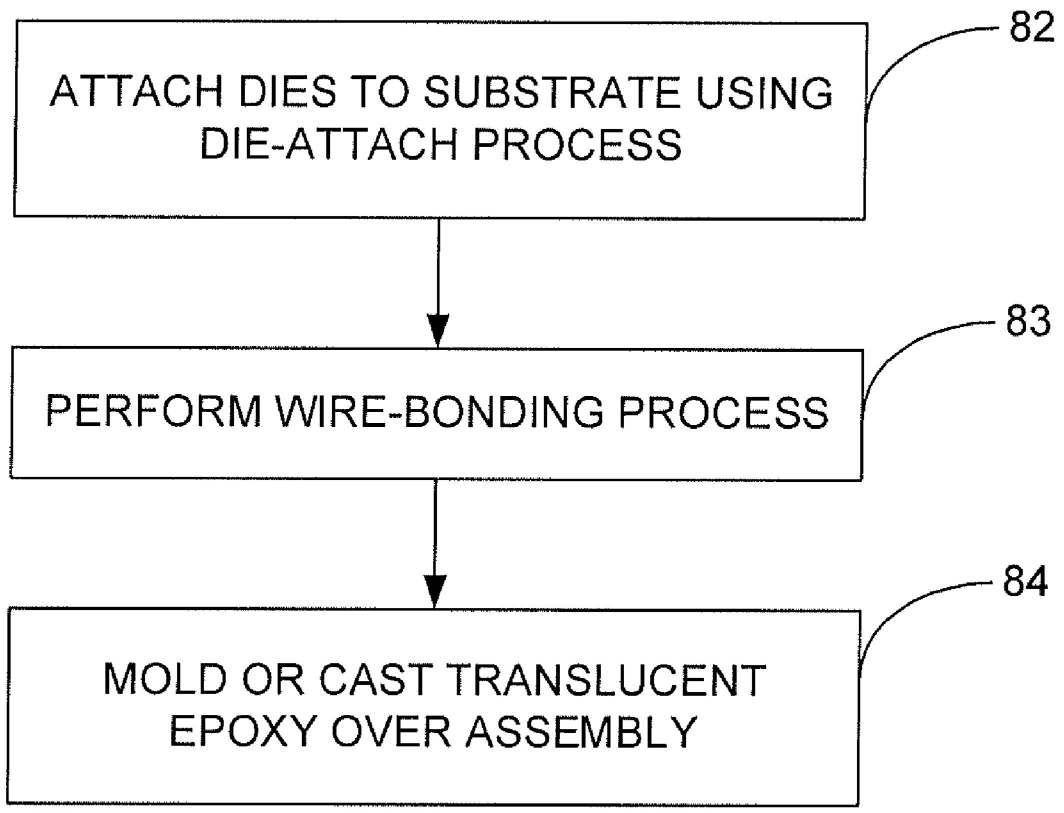
FIG. 6 illustrates a flowchart that represents the exemplary method described above with reference to FIG. 5.

FIG. 6 illustrates a flowchart that represents the exemplary method described above with reference to FIG. 5. The dies 54 and 57 are pre-coated with the coating materials 71 and 74, respectively. The dies 53, 54 and 57 are attached using a die-attach process, as indicated by block 82. Intermediate process steps may be performed after pre-coating the dies 54 and 57 and before attaching the dies 53, 54 and 57. After the dies have been attached, the dies are wire bonded to the conductors of the circuit board or lead frame substrate, as indicated by block 83. After wire bonding has been performed, the transparent epoxy 75 is then applied by a molding or casting process, as indicated by block 84. As stated above, other known process steps are typically performed after the transparent epoxy 75 has been applied.

The composite assembly 50 shown in FIG. 5 may have the same or similar dimensions to those shown in FIGS. 4A and 4B. However, because the composite assembly 50 shown in FIG. 5 does not require the cup 21 shown in FIG. 2, no space is required in the circuit board 60 for forming the cup 21, which facilitates further miniaturization of the composite assembly.

The invention has been described with reference to exemplary embodiments for the purpose of demonstrating the principles and concepts of the invention. As will be understood by those skilled in the art, many modifications may be made to the embodiments described herein and all such modifications are within the scope of the invention.

What is claimed is:

1. A composite assembly comprising:

a mounting device having a first output port and a second output port for communicating with an external electronic device;

a remote control (RC) receiver device mounted on the mounting device, the RC receiver device comprising an RC receiver integrated circuit (IC) and an infrared (IR) photodiode IC, the RC receiver IC having electrical connections that are connected to conductors of the mounting device, wherein one of the electrical connections provides a first output signal to the first output port of the mounting device, the IR photodiode IC being disposed in a cup formed in a surface of the mounting device;

an ambient light photosensor (ALPS) device mounted on the mounting device, the ALPS device comprising a photosensor IC, the ALPS photosensor IC having electrical connections that are connected to conductors of the mounting device, one of the electrical connections of the ALPS photosensor IC for providing a second output signal to the second output port of the mounting device; and an IR light pass filter disposed at least partially in the cup and covering at least a light-receiving surface of the IR photodiode IC to allow IR light to pass through the filter and impinge on the light-receiving surface of the IR photodiode IC while preventing other wavelengths of light from impinging on the light-receiving surface of the IR photodiode IC; and a visible light pass filter disposed at least on a light-receiving surface of the ALPS photosensor IC to allow visible light to pass through the visible light pass filter and impinge on the light-receiving surface of the ALPS photosensor IC while preventing non-visible wavelengths of light from impinging on the light-receiving surface of the ALPS photosensor IC.

2. The composite assembly of claim 1, wherein the RC receiver IC and the IR photodiode IC are integrated into a single die.

3. The composite assembly of claim 1, wherein the RC receiver device further comprises processing circuitry for processing electrical signals produced by the IR photodiode, and wherein said electrical connections of the RC receiver device correspond to pins of the RC receiver IC, said electrical connections of the ALPS photosensor IC corresponding to pins of the ALPS photosensor IC.

4. The composite assembly of claim 1, wherein the IR pass filter is an IR epoxy.

5. The composite assembly of claim 4, further comprising:

a transparent epoxy that covers at least a portion of the mounting device on which the ICs are mounted.

6. A method for making a composite assembly comprising:

providing a mounting device having a first output port and a second output port for communicating with an external electronic device, the mounting device having a cup formed in a surface thereof;

mounting a remote control (RC) receiver device on the mounting device, the RC receiver device comprising an RC receiver integrated circuit (IC) and an infrared (IR) photodiode IC, at least a portion of the IR photodiode being inside of the cup;

connecting electrical connections of the RC receiver device to conductors of the mounting device, one of the electrical connections being connected to the first output port;

mounting an ambient light photosensor (ALPS) device on the mounting device the ALPS device comprising an ALPS photosensor IC;

connecting electrical connections of the ALPS device to conductors of the mounting device, one of the electrical connections being connected to the second output port;

placing an IR light pass filter in the cup such that the filter covers at least a light-receiving surface of the IR photodiode IC, the IR light pass filter allowing IR light to pass through the IR light pass filter and impinge on the light-receiving surface of the IR photodiode IC while preventing other wavelengths of light from impinging on the light-receiving surface of the IR photodiode IC; and placing a visible light pass filter on the ALPS device such that the visible light pass filter covers at least a light-receiving surface of the ALPS photosensor IC, the visible light pass filter allowing visible light to pass through the visible light pass filter and impinge on the light-receiving surface of the ALPS photosensor IC while preventing non-visible light from passing through the visible light pass filter and impinging on the light-receiving surface of the ALPS photosensor IC.

7. The method of claim 6, wherein said electrical connections of the RC receiver device correspond to pins of the RC receiver IC, and wherein said electrical connections of the ALPS photosensor IC correspond to pins of the ALPS photosensor IC, and wherein at least one pin of the IR photodiode IC is electrically connected to at least one pin of the RC receiver IC, and wherein pins of the RC receiver IC and pins of the ALPS photosensor IC are electrically connected to conductors of the mounting device.

8. The method of claim 6, wherein the RC receiver IC and the IR photodiode are integrated into a single die.

9. The method of claim 6, wherein the cup is formed in the surface of the mounting device prior to mounting the RC receiver and ALPS devices on the mounting device, and wherein the IR light pass filter is an IR epoxy that is dispensed into the cup.

10. The method of claim 6, wherein the IR light pass filter is an IR light pass filter coating disposed at least on the light-receiving surface of the IR photodiode.

* * * * *

UNITED STATES PATENT AND TRADEMARK OFFICE

CERTIFICATE OF CORRECTION

PATENT NO. : 7,495,204 B2
APPLICATION NO. : 11/552036
DATED : February 24, 2009
INVENTOR(S) : Jing Zhang It is certified that error appears in the above-identified patent and that said Letters Patent is hereby corrected as shown below:

Column 8, Line 2, Claim 6, after “device” insert --,--.

Signed and Sealed this
Twenty-eighth Day of December, 2010

David J. Kappos
*Director of the United States Patent and Trademark Office*